US009753579B2

(12) United States Patent
Johansson et al.

(10) Patent No.: US 9,753,579 B2
(45) Date of Patent: Sep. 5, 2017

(54) PREDICTIVE INPUT SYSTEM FOR TOUCH AND TOUCHLESS DISPLAYS

(71) Applicant: Sony Mobile Communications Inc., Tokyo (JP)

(72) Inventors: Magnus Ola Johansson, Dösjebro (SE); Olivier Thierry Nicolas Moliner, Lund (SE); Magnus Midholt, Lund (SE); Alexander Leonard Hunt, Tygelsjö (SE); Sergii Skorokhodov, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 262 days.

(21) Appl. No.: 14/391,411

(22) PCT Filed: Feb. 4, 2014

(86) PCT No.: PCT/IB2014/000102
§ 371 (c)(1),
(2) Date: Oct. 9, 2014

(87) PCT Pub. No.: WO2015/118366
PCT Pub. Date: Aug. 13, 2015

(65) Prior Publication Data
US 2016/0291788 A1    Oct. 6, 2016

(51) Int. Cl.
*G06F 3/041*    (2006.01)
*G06F 3/043*    (2006.01)
(Continued)

(52) U.S. Cl.
CPC ............ *G06F 3/0418* (2013.01); *G06F 3/044* (2013.01); *G06F 3/0416* (2013.01);
(Continued)

(58) Field of Classification Search
CPC .......... G06F 3/041; G06F 3/043; G06F 3/045; G06F 3/048
See application file for complete search history.

(56) References Cited

U.S. PATENT DOCUMENTS 8,487,896 B1    7/2013    Brown et al.
8,525,799 B1 *   9/2013    Grivna ................. G06F 3/0416
                                                    345/173
(Continued)

OTHER PUBLICATIONS

International Search Report and Written Opinion issued in corresponding PCT application No. PCT/IB2014/000102, dated Sep. 24, 2014, 14 pages.

*Primary Examiner* — Ricardo L Osorio
(74) *Attorney, Agent, or Firm* — Tucker Ellis, LLP

(57) ABSTRACT

A device comprising a display, a predictive input system coupled to the display and configured to store zone data indicating zones of the display, wherein each zone constitutes a portion of a display area; store predictive parameter data, wherein each zone is assigned a subset of predictive parameter data, wherein each subset indicates at least one of a look-ahead prediction value that indicates a time period corresponding to how far in the future a predictive user input pertains, an indication of a particular prediction algorithm, or at least one value used by the particular prediction algorithm, and wherein at least two zones of the display have different values for the subsets of predictive parameter data; receive input data via the display; determine the zone in which the input data is received; and generate prediction data based on the input data, the zone data, and the subset of predictive parameter data.

20 Claims, 13 Drawing Sheets

(51) Int. Cl.
*G06F 3/0488* (2013.01)
*G06F 3/0485* (2013.01)
*G06F 3/044* (2006.01)
*H04M 1/725* (2006.01)

(52) U.S. Cl.
CPC .......... *G06F 3/0485* (2013.01); *G06F 3/0488* (2013.01); *G06F 3/04883* (2013.01); *H04M 1/72583* (2013.01); *G06F 2203/04101* (2013.01); *G06F 2203/04104* (2013.01); *G06F 2203/04108* (2013.01)

(56) References Cited

U.S. PATENT DOCUMENTS

| | | | |
|---|---|---|---|
| 8,577,535 B2* | 11/2013 | Cummings | G06F 3/04815 701/2 |
| 8,760,424 B2* | 6/2014 | Laubach | G06F 3/0416 345/173 |
| 9,030,418 B2* | 5/2015 | Ku | G06F 3/0416 345/156 |
| 9,104,272 B2* | 8/2015 | Klinghult | G06F 3/0416 |
| 9,360,958 B2* | 6/2016 | Kurokawa | G06F 3/0412 |
| 9,363,640 B2* | 6/2016 | Lee | H04W 8/22 |
| 2013/0027342 A1 | 1/2013 | Oba | |
| 2013/0342468 A1 | 12/2013 | Hekstra | |

\* cited by examiner

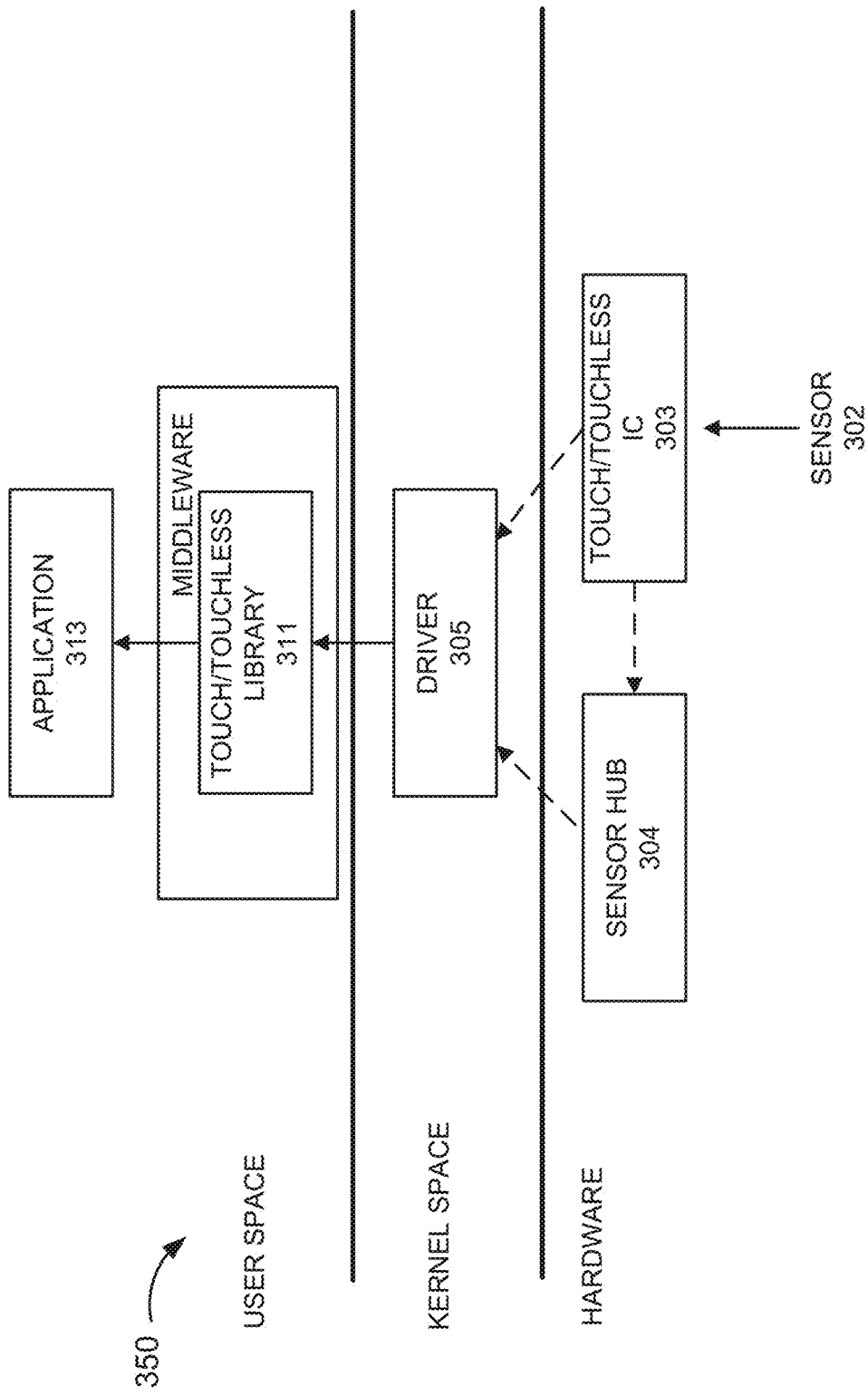

PREDICTIVE INPUT SYSTEM FOR TOUCH AND TOUCHLESS DISPLAYS

BACKGROUND

Touch screens (also known as touch displays or touch panels) are commonplace in existing mobile devices. Additionally, touchless screen technology has been introduced and may be considered a next-generation form of input for users of various devices. While these various input technologies allow users a great deal of flexibility, their integration with applications running on a mobile device presents various complexities.

SUMMARY

According to one aspect, a device may comprise a display, wherein the display is configured to operate in at least one of a touch mode or a touchless mode, a predictive input system communicatively coupled to the display, wherein the predictive input system comprises: a memory, wherein the memory stores instructions, and a processor. The processor may execute the instructions to: store zone data indicating zones of the display, wherein each zone constitutes a portion of a display area of the display; store predictive parameter data, wherein each zone of the zone data is assigned a subset of the predictive parameter data, wherein each subset of the predictive parameter data indicates at least one of a look-ahead prediction value that indicates a time period corresponding to how far in the future a predictive user input pertains, an indication of a particular prediction algorithm, or at least one value used by the particular prediction algorithm, and wherein at least two zones of the display have different values for the subsets of predictive parameter data; receive, via the display, input data stemming from a user's input; determine the zone in which the input data is received; generate prediction data based on the input data, the zone data associated with the determined zone, and the subset of predictive parameter data associated with the determined zone; and output the prediction data.

Additionally, the zone data may be generated based on a predictive input accuracy signature of an entire display area of the display, the predictive input accuracy signature may indicate an accuracy for calculating predictive data based on different noise levels associated with respective portions of the display area, the display may use a capacitive-based sensing technology, and the display may display the prediction data.

Additionally, the display may include a single-point input device or a multi-point input device, and wherein the user device may comprise a mobile communication device having telephone and data communication capabilities.

Additionally, the at least one value may include an interpolated value, a number of zones may be two or three, and a shape of each zone may be different.

Additionally, the at least one value may pertain to a sensitivity to noise, and a shape and a size of each zone may be unlike a size and shape of the user's input stemming from the user's finger or an instrument used by the user.

According to another aspect, a method may comprise storing, by a user device that includes a display, zone data indicating zones of the display, wherein each zone constitutes a portion of a display area of the display, and the display is at least one of a touch display or a touchless display; storing, by the user device, predictive parameter data, wherein each zone of the zone data is assigned a subset of the predictive parameter data, wherein each subset of the predictive parameter data indicates at least one of a look-ahead prediction value that indicates a time period corresponding to how far in the future a predictive user input pertains, an indication of a particular prediction algorithm, or at least one value used by the particular prediction algorithm, and wherein at least two zones of the display have different values for the subsets of the predictive parameter data; receiving, by the user device, input data stemming from a user's input; determining, by the user device, the zone in which the input data is received; generating, by the user device, prediction data based on the input data, the zone data associated with the determined zone, and the subset of predictive parameter data associated with the determined zone; and outputting, by the user device, the prediction data.

Additionally, a shape and a size of each zone may be unlike a shape and size of the user's input stemming from the user's finger or an instrument used by the user.

According to yet another aspect, a device may comprise a display, wherein the display is configured to operate in at least one of a touch mode or a touchless mode; and a predictive input system communicatively coupled to the display. The predictive input system may comprise: a memory, wherein the memory stores instructions; and a processor. The processor may execute the instructions to: receive, via the display, input data stemming from a user's input; convert the input data into event data; generate prediction data based on the event data, a prediction algorithm, and a predictive step value, wherein the predictive step value indicates a time period corresponding to how far in the future a predictive user input pertains, and wherein the predictive step value is gradually increased based on an interpolation between predicted positions over a pre-determined number of events; perform overshoot compensation to the prediction data; perform de-entanglement between events based on a sign of a direction between real events associated with the user's input compared to a sign of direction between predicted events; perform post-smoothing; and output the prediction data.

Additionally, the processor may further execute the instructions to perform pre-smoothing of the event data using a smoothing algorithm, wherein an event data window having an event data window size corresponding to half of the event data is used to designate a portion of the event data to be pre-smoothed, and wherein the event data window is continuously moved as new event data is received.

Additionally, when performing overshoot compensation, the processor may further execute the instructions to determine an acceleration between events; calculate a first value based on the acceleration; and determine whether the prediction step value is to be increased, be decreased, or remain as is based on the first value.

Additionally, when performing overshoot compensation, the processor may further execute the instructions to: determine a speed between the events; calculate a second value based on the speed; and determine whether the prediction step value is to be increased, be decreased, or remain as is based on the first value and the second value.

Additionally, the predicted events may include a previous predicted event $P(t-1)$ and a current predicted event $P(t)$, and wherein, when performing de-entanglement, the processor may further execute the instructions to maintain a value of the previous predicted event $P(t-1)$ for the current predicted event $P(t)$ if the sign of direction between the real events differ from the sign of direction between the predicted events.

According to still another aspect, a method may comprise receiving, by a user device that includes a display, input data stemming from a user's input, wherein the display is at least one of a touch display or a touchless display; converting, by the user device, the input data into event data; generating, by the user device, prediction data based on the event data a prediction algorithm, and a predictive step value, wherein the predictive step value indicates a time period corresponding to how far in the future a predictive user input pertains, and wherein the predictive step value is gradually increased based on an interpolation between predicted positions over a pre-determined number of events; performing, by the user device, overshoot compensation to the prediction data; performing, by the user device, de-entanglement between events based on a sign of a direction between real events associated with the user's input compared to a sign of direction between predicted events; performing, by the user device, post-smoothing; and outputting, by the user device, the prediction data.

Additionally, the method may comprise performing pre-smoothing of the event data using a smoothing algorithm, wherein an event data window having an event data window size corresponding to half of the event data is used to designate a portion of the event data to be pre-smoothed, and wherein the event data window is continuously moved as new event data is received.

Additionally, the performing overshoot compensation may comprise determining an acceleration between events; calculating a value of an acceleration factor based on the acceleration; and determining whether the prediction step value is to be increased, be decreased, or remain as is based on the value.

Additionally, the input data may correspond to handwriting or drawing by the user.

Additionally, the input data may correspond to user scrolling input.

According to yet another aspect, a method may comprise storing, by a user device that includes a display, zone data indicating zones of the display, wherein each zone constitutes a portion of a display area of the display, and the display is at least one of a touch display or a touchless display; receiving, by the user device, input data stemming from a user's input; determining, by the user device, the zone in which the input data is received; selecting, by the user device, a prediction value function based on the zone; generating, by the user device, a prediction value based on the prediction value function; generating, by the user device, prediction data based on a prediction algorithm using the prediction value; and outputting, by the user device, the prediction data.

Additionally, the prediction value function outputs a predictive scaled value based on a range argument and a scalar argument.

Additionally, at least two zones of the display have different prediction values.

DESCRIPTION OF THE DRAWINGS

The accompanying drawings, which are incorporated in and constitute a part of this specification, illustrate exemplary embodiments described herein and, together with the description, explain these exemplary embodiments.

FIG. 3B is a diagram illustrating exemplary components of an input system associated with the display;

DETAILED DESCRIPTION

Figure 1A:
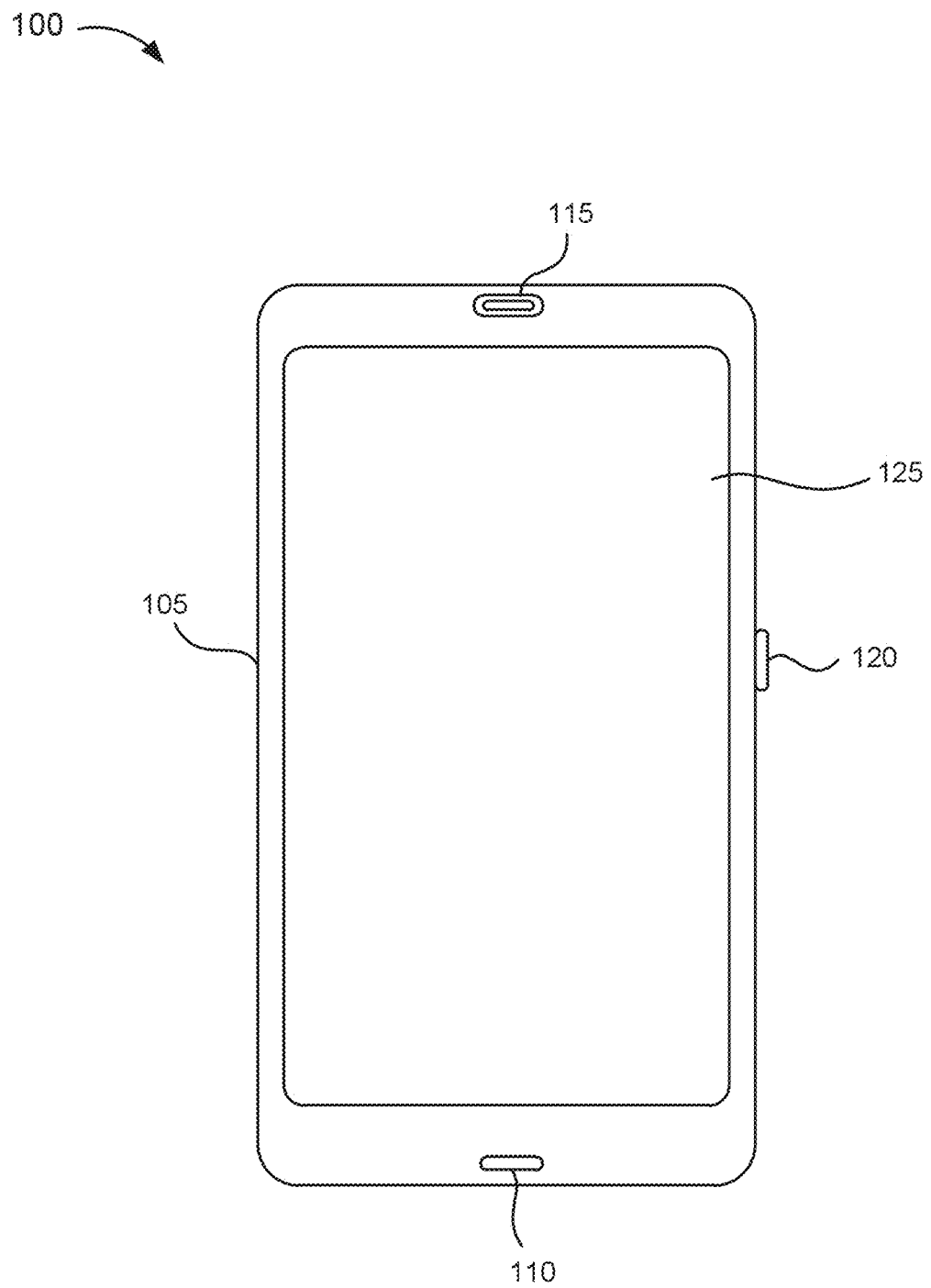
FIGS. 1A and 1B are diagrams illustrating an exemplary user device in which exemplary embodiments of a predictive input system may be implemented.

The following detailed description refers to the accompanying drawings. The same reference numbers in different drawings may identify the same or similar elements.

Input prediction pertaining to user input via touch and touchless displays presents various challenges. For example, when predicting a user input (e.g., the drawing of a line), it is important that the input data is of good quality. Unfortunately, differences in time between the input data or jitter in the data can cause problems for a prediction algorithm. While there are ways of smoothing data and using timestamps, these techniques cause a delay of the input to the prediction process. In some cases, the end result of prediction will be slower than using the real data stemming from the user's input.

Prediction algorithms are more or less sensitive to noise in the incoming signal or data. Many prediction algorithms amplify not only the intended data but also the noise. As a result, the output of a prediction algorithm produces predictive artifacts (e.g., errors), which may become quite large even if the incoming signal or data includes only a small amount of noise or instability.

On a device, such as a mobile device that includes a capacitive touch sensor mounted on a display, the amount of noise produced may increase depending on the distance of the user input from the edge of the display and the distance from components of the display (e.g., a display driver integrated circuit (IC)).

In view of the foregoing problems and disadvantages, an exemplary embodiment is described that may mitigate the existence of prediction artifacts that arise. The exemplary embodiment may also provide a good input prediction over the entire area of the display.

According to an exemplary embodiment, a characterization of a touch/touchless (i.e., touch and/or touchless) display is performed. For example, the characterization may be performed during production or during development and verification work. The characterization of the touch/touchless display may be used as a basis to generate a signature for accuracy of a predictive input relative to the entire display area of the touch/touchless display. As previously mentioned, accuracy pertaining to prediction (of a user input) may be lower near the edge or perimeter of the display area of the touch/touchless display versus a center area of the touch/touchless display due to noise (e.g., in the form of a signal or data) that accompanies user input (e.g., in the form of a signal or data) to a prediction algorithm. In this regard, a predictive input accuracy signature may be generated, based on the characterization, in which variations of accuracy are indicated.

Based on the characterization of the touch/touchless display, various methods, singly or in any combination, may be used to mitigate the problem of accuracy of prediction. According to an exemplary embodiment, one method is to control prediction aggressiveness. Prediction aggressiveness, as used herein, means how far ahead in the future for which the target prediction aims. For example, the prediction aggressiveness may be represented by a look-ahead prediction value. By way of further example, the look-ahead prediction value may be between 1 millisecond and 60 milliseconds, or some other suitable range. In this regard, the look-ahead prediction value may be dynamic. For example, different areas of the touch/touchless display may be assigned different look-ahead prediction values.

In many prediction algorithms, there are parameters that control, among other things, the sensitivity to noise and irregularity, smoothing factors, etc. According to an exemplary embodiment, another method uses different values for a parameter with regard to a particular prediction algorithm. For example, the value of a parameter that controls sensitivity to noise may be a dynamic value. That is, different areas of the touch/touchless display may be assigned different values for the parameter. Additionally, in view of the various prediction algorithms available for use, according to an exemplary embodiment, yet another method uses different prediction algorithms. That is, different areas of the touch/touchless display may be assigned different prediction algorithms.

According to an exemplary embodiment, the selection and use of each of these predictive methods (also referred to as "predictive parameters"), or some combination of these predictive parameters, may be based on a selection criterion. According to an exemplary embodiment, the selection criterion may be zone-based. For purposes of description, a zone constitutes a display area of the touch/touchless display. For example, a zone may be an area having a size and a shape that is equivalent to the size and the shape of an imaginary user's index finger, or an end of an imaginary stylus or other instrument. Alternatively, the zone may be an area having a size and a shape that is larger. For example, the touch/touchless display may be divided into 2 zones, 3 zones, 4 zones, or more. In this regard, a zone may have various shapes and/or sizes. Additionally, in view of the characterization of the touch/touchless display, the shape and the size of one zone may be distinctive from the shape and size of another zone.

In view of the zone-based selection criterion, according to the one method (i.e., dynamic predictive aggressiveness), different zones of the touch/touchless display be assigned different look-ahead prediction values. According to another method (i.e., dynamic parameters), different values for parameters used by a prediction algorithm may be assigned to different zones of the touch/touchless display. Also, according to yet another method (i.e., different prediction algorithms), different zones of the touch/touchless display may be assigned different prediction algorithms. Additionally, one or multiple methods may be used within a particular zone of the touch/touchless display.

According to another exemplary embodiment, the selection of each of these methods, or some combination of these methods, may be based on a selection algorithm. The selection algorithm may be linear, exponential, lookup table-based, etc. The selection algorithm may change the prediction model and/or a parameter of the prediction model depending on where a user input occurs via the touch/touchless display. The selection algorithm is described further below.

Additionally, other problems exist in relation to input prediction. For example, in a touch-enabled device, there is latency between the time the user touches a touch display and a touch event is generated, and the time that the user gets feedback, as a result of the touch, via the touch display. Generally speaking, this type of latency is called "system latency" and the user-perceived time is called "touch responsiveness." It naturally follows that the longer the latency, the slower the device is (e.g., in terms of processing user inputs), as perceived by the user. This problem may exist for touchless displays as well. In this regard, it has been shown that a low performance platform/device having small system latency provides a faster user experience and is considered more responsive than a high performance platform/device having high system latency. Since comparisons between devices can be made based on this criterion, new benchmarks are continuing to emerge.

In view of the foregoing problems and disadvantages, an exemplary embodiment is described that introduces a prediction step parameter in the input event processing of a user input, which is responsive to the user input. According to an exemplary embodiment, the prediction step parameter indicates the size of a prediction. According to an exemplary implementation, the size of the prediction is measured by the number of events. For example, 5 events forward associated with an event report rate of 120 Hz will result in a prediction step of about 41 milliseconds (i.e., 5/120) in the future. According to an exemplary embodiment, the prediction step parameter may be configured as a static value or a dynamic value.

Typically, if a prediction algorithm does not adapt fast enough to the user input (e.g., due to changes (e.g., large changes) in speed, acceleration, direction, etc.), the occurrence of an overshoot may result (generally labeled as an artifact). According to an exemplary embodiment, the value of the prediction step parameter may be adaptive based on a characteristic of the user input. The adaptive nature of the prediction step parameter may reduce the occurrence of overshoots. According to an exemplary implementation, a user input characteristic includes acceleration between events. By way of example, when a user draws a line, there may be an occurrence of acceleration as the user draws the line. A value for an acceleration factor may be calculated based on this user input. The value may be representative of the acceleration and depending on the value, the prediction step parameter may be changed (e.g., increased or decreased) or remain static. According to another exemplary implementation, a user input characteristic includes speed between events. For example, according to a similar example, as the user draws a line, there may be variations in speed that occur. A value for a speed factor may be calculated and depending on the value, the prediction step parameter may be changed (e.g., increased or decreased) or remain static.

Another artifact that may result, due to prediction and corrective measures for overshoot, is a tangle of events. According to an exemplary embodiment, an algorithm is applied to reduce/remove tangles. According to the algorithm, the sign of direction between real events (e.g., E(t−1) and E(t)) are compared to the sign of direction between predicted events (e.g., P(t−1) and P(t)). If the signs differ, the previous predicted value is used (e.g., P(t)=P(t−1)), otherwise, the signs are maintained, as described further below.

According to an exemplary embodiment, smoothing filters are used subsequent to the prediction of the user input. For example, a Kalman Filter algorithm or another smoothing algorithm (e.g., an exponential smoothing algorithm, etc.), as described further below, may be used after prediction.

According to an exemplary embodiment, a user device includes a predictive input system, as described herein, which includes one or multiple embodiments, as described above and as set forth below.

FIG. 1A is a diagram of an exemplary user device 100 in which exemplary embodiments described herein may be implemented. While illustratively speaking, user device 100 may be representative of, for example, a smartphone, a cellphone, or a personal digital assistant (PDA). User device 100 may be implemented as various other types of mobile devices. For example, user device 100 may take the form of a tablet device, a data organizer, a picture capturing device, a video capturing device, a Web-access device, a computer, a palmtop device, a netbook, a gaming device, a location-aware device, a music playing device, or some other type of mobile device that includes a display (e.g., a laptop, a wrist device, a vehicular communication system, etc.). Alternatively, user device 100 may be implemented as a non-mobile device (e.g., a television, a kiosk or a vending machine that includes a touch/touchless display, etc.) or any other form of an electronic device (e.g., simply a touch and/or touchless display, which may be external to another device or a standalone device).

As illustrated in FIG. 1A, user device 100 comprises a housing 105, a microphone 110, a speaker 115, a button 120, and a display 125. According to other embodiments, user device 100 may comprise fewer components, additional components, different components, and/or a different arrangement of components than those illustrated in FIG. 1A and described herein. Additionally, user device 100 may take the form of a different configuration (e.g., a slider, a clamshell, a swivel, etc.) than the configuration illustrated in FIG. 1A.

Housing 105 comprises a structure to contain components of user device 100. For example, housing 105 may be formed from plastic, metal, or some other type of material. Housing 105 may support microphone 110, speaker 115, button 120, and display 125.

Microphone 110 is capable of transducing a sound wave to a corresponding electrical signal. For example, a user may speak into microphone 110 during a telephone call or to execute a voice command. Speaker 115 is capable of transducing an electrical signal to a corresponding sound wave. For example, a user may listen to music or listen to a calling party through speaker 115. Button 120 provides an input to user device 100. For example, button 120 may be used to perform one or multiple functions (e.g., turn on/turn off user device 100, etc.).

Figure 1B:
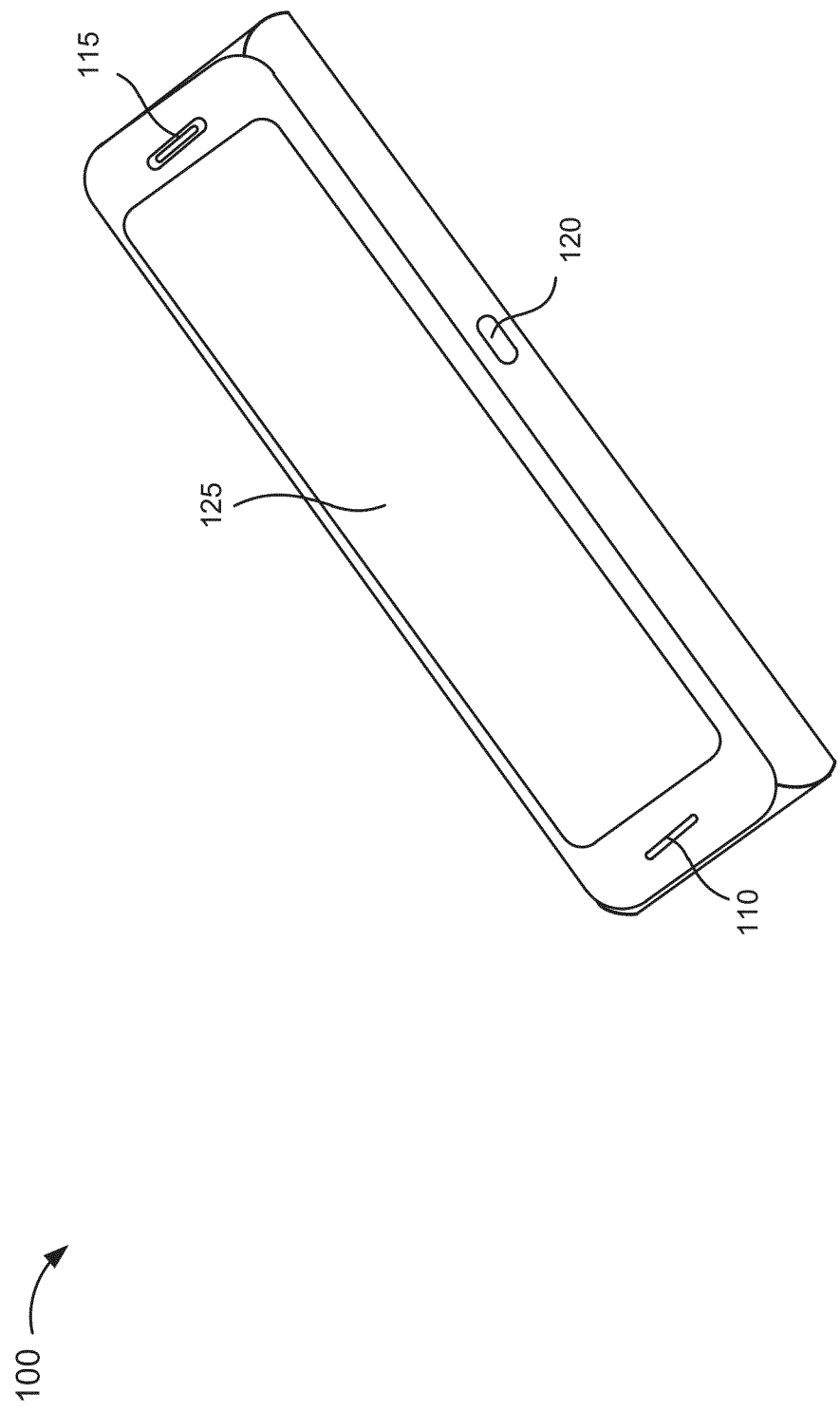

Display 125 operates as an output component. For example, display 125 may comprise a liquid crystal display (LCD), a plasma display panel (PDP), a field emission display (FED), a thin film transistor (TFT) display, or some other type of display technology (e.g., organic LED (OLED), active matrix OLED (AMOLED), etc). Display 125 may be capable of displaying text, pictures, video, various images (e.g., icons, objects, etc.) that may be selected by a user to access various applications, enter data, and/or navigate, etc. Display 125 may also be capable of providing haptic or tactile feedback. Additionally, display 125 operates as an input component. For example, display 125 may comprise a touch-sensitive screen. Display 125 may be implemented using a variety of sensing technologies, including but not limited to, capacitive sensing, surface acoustic wave sensing, resistive sensing, optical sensing, pressure sensing, infrared sensing, or gesture sensing. In such instances, display 125 may correspond to a single-point input device (e.g., capable of sensing a single touch) or a multipoint input device (e.g., capable of sensing multiple touches that occur at the same time). Additionally, or alternatively, display 125 may comprise a touchless screen (e.g., having air-touch, air-gesture capabilities). References herein to a "display," a "touchless display," a "touch display," and the like are intended to encompass integrated and external displays. FIG. 1B is diagram illustrating another view of user device 100.

Figure 2:
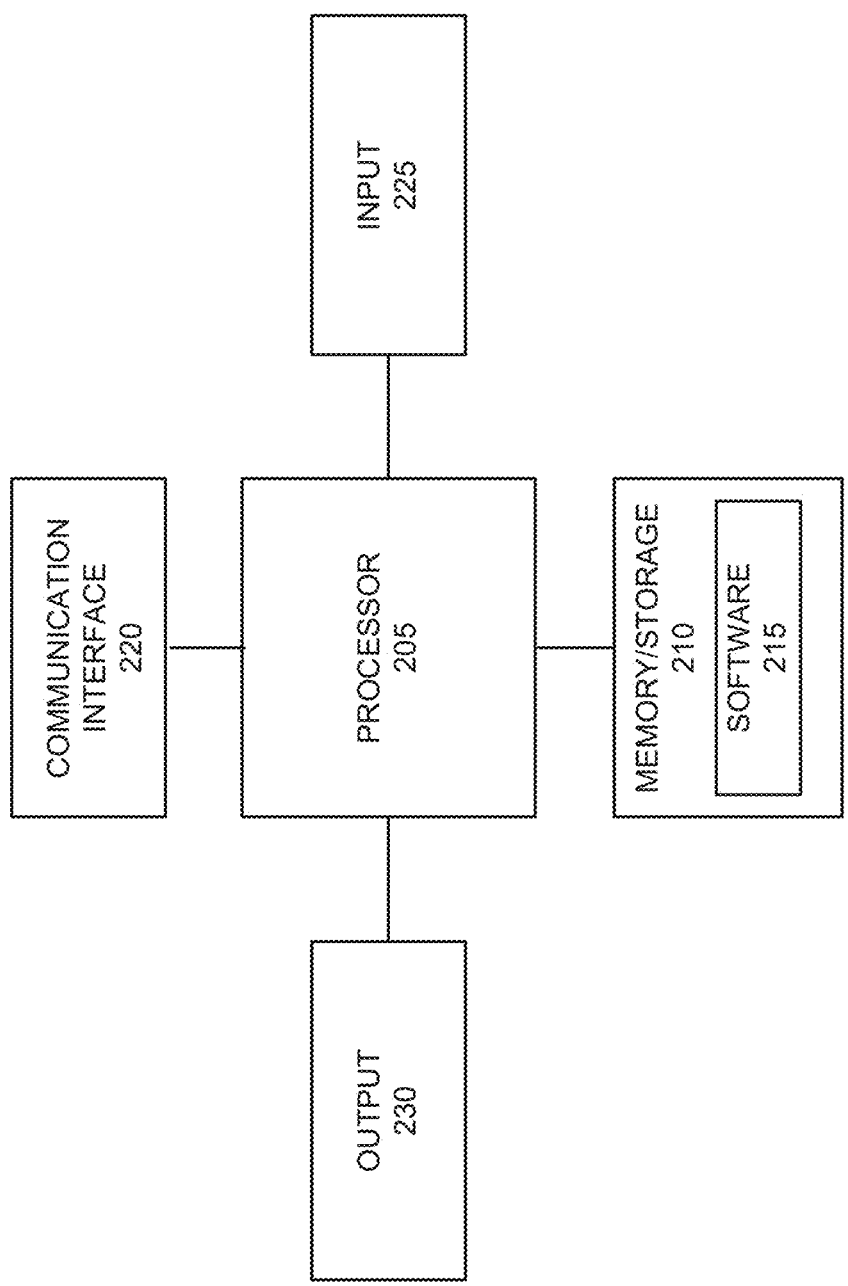
FIG. 2 is a diagram illustrating exemplary components of the user device.

FIG. 2 is a diagram illustrating exemplary components of user device 100 depicted in the previous figures and described herein. As illustrated, according to an exemplary embodiment, user device 100 includes a processor 205, memory/storage 210, software 215, a communication interface 220, an input 225, and an output 230. According to other embodiments, user device 100 may include fewer components, additional components, different components, and/or a different arrangement of components than those illustrated in FIG. 2 and described herein.

Processor 205 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 205 may be implemented as hardware (e.g., a microprocessor, etc.), a combination of hardware and software (e.g., a SoC, an ASIC, etc.), may include one or multiple memories (e.g., memory/storage 210), etc.

Processor 205 controls the overall operation or a portion of operation(s) performed by user device 100. Processor 205 performs one or multiple operations based on an operating system and/or various applications or programs (e.g., software 215). Processor 205 may access instructions from memory/storage 210, from other components of user device 100, and/or from a source external to user device 100 (e.g., a network, another device, etc.).

Memory/storage 210 includes one or multiple memories and/or one or multiple other types of storage mediums. For example, memory/storage 210 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 210 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 210 may include drives for reading from and writing to the storage medium.

Software 215 may include an application or a program that provides a function and/or a process. Software 215 may include firmware. By way of example, software 215 may comprise a telephone application, a multi-media application, an e-mail application, a contacts application, a calendar application, an instant messaging application, a web browsing application, a location-based application (e.g., a Global Positioning System (GPS)-based application, etc.), a handwriting application, a drawing application, a camera application, etc. As described herein, the input system may be implemented using software 215 and processor 205. Additionally, as described herein, the prediction input system may be implemented using software 215 and processor 205. The prediction input system may include a dedicated processor/circuitry to execute software 215 versus, for example, relying on a main central processing unit (CPU) of user device 100 to execute software 215. Exemplary components of the prediction input system are described further below.

Communication interface 220 permits user device 100 to communicate with other devices, networks, systems, etc. Communication interface 220 may include one or multiple wireless interfaces and/or wired interfaces. Communication interface 220 may include one or multiple transmitters, receivers, and/or transceivers. Communication interface 220 operates according to one or multiple protocols, a communication standard, and/or the like.

Input 225 permits an input into user device 100. For example, input 225 may comprise a keypad, a display (e.g., display 125), a touch pad, a button, a switch, a microphone (e.g., microphone 110), an input port, a knob, and/or some other type of input component. Output 230 permits user device 100 to provide an output. For example, output 230 may include a display (e.g., display 125), a speaker (e.g., speakers 115), a light emitting diode (LED), an output port, a vibratory mechanism, or some other type of output component.

User device 100 may perform a process and/or a function in response to processor 205 executing software 215 stored by memory/storage 210. By way of example, instructions may be read into memory/storage 210 from another memory/storage 210 or read into memory/storage 210 from another device via communication interface 220. The instructions stored by memory/storage 210 causes processor 205 to perform the process or the function. Alternatively, user device 100 may perform a process or a function based on the operation of hardware (processor 205, etc.).

As previously described, according to an exemplary embodiment, user device 100 includes an input system associated with display 125. A description of exemplary components of display 125 is described further below.

Figure 3A:
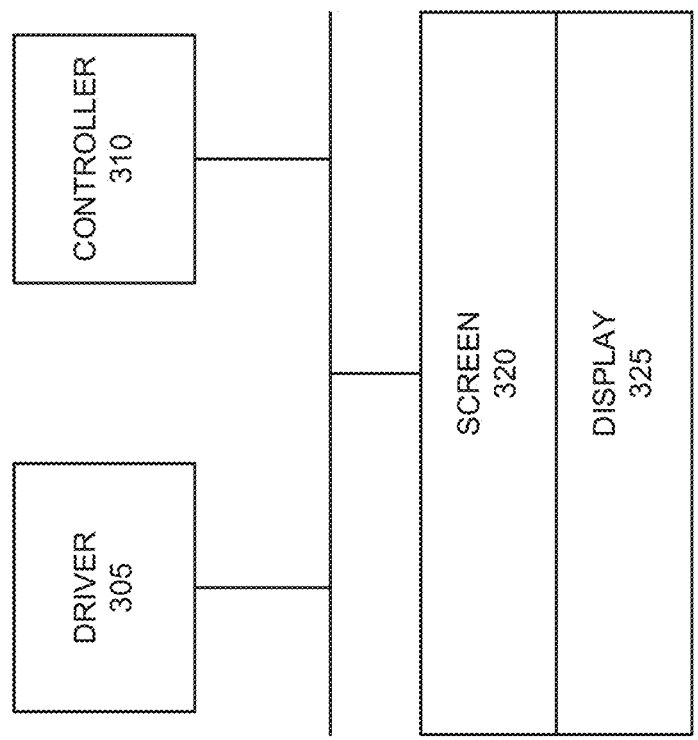
FIG. 3A is a diagram illustrating exemplary components of a display.

Referring to FIG. 3A, according to an exemplary embodiment, display 125 comprises a driver 305, a controller 310, a screen 320, and a display 325. The connections between these components are merely exemplary.

Driver 305 comprises logic that manages display 125, such as, for example, enabling and disabling, power-state change notifications, and calibration functions pertaining to display 125. Controller 310 comprises logic to control and/or integrate functions associated with display 125. For example, controller 310 may control and/or integrate components such as display driving and sensing circuits, power circuits, finger/instrument tracking, touchless tracking, and digital signal processing pertaining to display 125. Screen 320 may be a surface (e.g., a layer made of glass, plastic, etc.) positioned forward or on top of display 325. Display 325 may include an illumination assembly, circuit, etc. (e.g., OLED, LCD, etc.).

As previously described, a user device (e.g., user device 100) includes a predictive input system that provides a functionality associated with a touch/touchless display (e.g., display 125), as described above and as set forth below according to one or multiple embodiments.

According to an exemplary embodiment, the predictive input system may be implemented within one or multiple components of an exemplary input system. FIG. 3B is a diagram illustrating an exemplary embodiment of an input system 350 of user device 100. As illustrated, input system 350 includes a sensor 302, a touch/touchless IC 303, a sensor hub 304, driver 305, and a touch/touchless library 311. According to other embodiments, input system 350 may include additional components, fewer components, and/or different components. For example, according to another exemplary embodiment, input system 350 may not include sensor hub 304. Additionally, or alternatively, for example, according to other embodiments, a component illustrated as a separate component may be combined with another component. For example, sensor 302, touch/touchless IC 303, and/or sensor hub 304 may be combined as a single component. Although, FIG. 3B illustrates a user space, a kernel space, and a hardware layer, these spaces/layers are exemplary and may have other nomenclatures depending on the operating system, platform, etc., implemented.

FIG. 3B also illustrates an application 313. Application 313 represents software (e.g., software 215) that provides a user interface via which a user's input is received. For example, application 313 may correspond to a drawing application or a handwriting application. Alternatively, application 313 may correspond to another type of application that includes various interactive elements (e.g., a menu, scroll bar, etc.) in which prediction may be used.

Sensor 302 comprises logic to detect an input of a user. For example, as previously described, display 125 may be implemented using one or multiple sensing technologies, such as capacitive sensing, surface acoustic wave sensing, resistive sensing, optical sensing, pressure sensing, etc. Touch/touchless IC 303 comprises logic to, for example, calculate coordinates, amplify a user input signal, convert a user input signal into the digital domain, etc., relative to the user's input. Sensor hub 304 may be implemented as a digital signal processor (DSP). Sensor hub 304 may process other sensor data (e.g., accelerator, etc.), in addition to sensor data stemming from the user's interaction with display 125.

Driver 305 has been previously described. As illustrated, driver 305 operates in the kernel space in which input data is exposed via a kernel interface to the user space. For example, on a Linux-based system, the input data (e.g., kernel data structures, their attributes, linkages between them, etc.) may be exposed via "sysfs" (e.g., a RAM-based file system) to the user space. According to other implementations in which a different operating system exists, driver 305 may expose the input data via a different pathway, file, etc., supported by the operating system or configuration of user device 100.

Touch/touchless library 311 operates as a middleware library in the user space. Touch/touchless library 311 includes an application programming interface (API) to application 313. Touch/touchless library 311 may expose the API or be integrated with a high level operating system (OS) framework. Additionally, touch/touchless library 311 may translate low level touch/touchless inputs into OS-specific touch/touchless events. Touch/touchless library 311 may rely on a main processor (e.g., processor 205) of user device 100 to execute software (e.g., software 215) or a dedicated processor (e.g., processor 205). In FIG. 3B, various pathways (using dotted arrows and solid arrows) by which sensed data or processed sensed data may be received by an embodiment of input system 350 and exposed to or made available to application 313 are illustrated.

Various embodiments of the prediction input system are described. One or multiple components of input system 350 may be used to implement the prediction input system and carry out the functionality associated with the various embodiments described herein. According to the description that follows, the prediction input system is described in relation to sensor hub 304.

According an exemplary embodiment, as previously described, a characterization of touch/touchless display 125 is obtained. According to this example, display 125 includes capacitive sensors for detecting a user's input. During production or during development and verification work, the zones for display 125 and the predictive methods may be determined According to this example, the prediction input system (e.g., sensor hub 304) includes data and logic based on the characterization, as described further below.

Figure 4A:
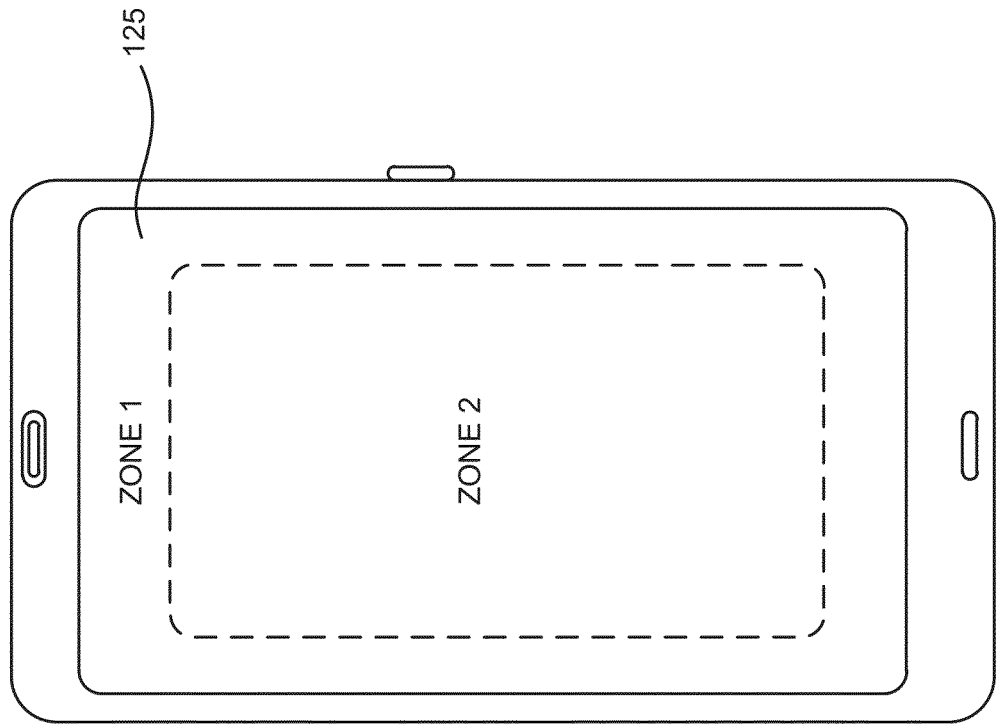
FIG. 4A is a diagram illustrating an exemplary embodiment of a prediction input system.
Figure 4A:
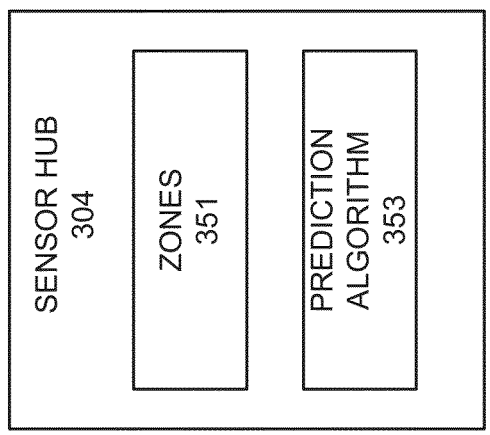

Based on the characterization, sensor hub 304 may use zones as a basis for selecting and using predictive parameters for each zone. As illustrated in FIG. 4A, sensor hub 304 stores zones 351 (e.g., a file, a table or other suitable data structure, or a database) that includes data indicating a display area of display 125. For example, as illustrated in FIG. 4A, according to an exemplary implementation, zones 351 may indicate a zone 1 and a zone 2 pertaining to display 125. According to other implementations, the number and/or the shape of the zones may be different, as previously described. Additionally, zones 351 may include predictive parameter data indicating the predictive parameters, such as values (e.g., look-ahead prediction values, values for parameters pertaining to prediction algorithm, etc.), identification of a prediction algorithm, etc., which are assigned to a particular zone (e.g., zone 1 and zone 2). Additionally, the predictive parameter data may be on a per-user and/or a per-application basis. For example, if application 313 is a drawing application or a handwriting application, look-ahead prediction values may be different for zone 1 and zone 2, compared to if application 313 is a web browser, the desktop user interface, etc. Alternatively, the predictive parameter data may be global, irrespective of the user and/or the application for which prediction is applied.

Additionally, according to an exemplary implementation, sensor hub 304 stores a prediction algorithm 353. Prediction algorithm 353 may include one or multiple prediction algorithms, such as, for example, a Double Exponential Smoothing Prediction (DESP) algorithm, a Kalman Filter algorithm, an Unscented Kalman Filter algorithm, a Polyfit algorithm, a Spline algorithm, a Machine Learning algorithm, etc.

According to an exemplary embodiment, when input data is received by sensor hub 304, sensor hub 304 identifies a display area of display 125 via which the input data is received. For example, touch/touchless IC 303 may provide coordinate information pertaining to the user input to sensor hub 304. Sensor hub 304 includes logic to select the appropriate zone from zones 351. Each zone of zones 351 may be assigned one or multiple predictive methods, as previously described. For example, according to an exemplary embodiment, sensor hub 304 includes logic in which zone 1 and zone 2 of display 125 are assigned different look-ahead prediction values. For example, assume the characterization indicated that zone 1 exhibited a larger accuracy drop (e.g., due to noise) than zone 2. According to such an example, the look-ahead prediction value (e.g., 5 milliseconds) assigned to zone 1 may be smaller than the look-ahead prediction value (e.g., 45 milliseconds) assigned to zone 2.

According to other embodiments, as previously described, different values for certain parameters with regard to a particular prediction algorithm may be changed (i.e., have dynamic values) and/or different prediction algorithms may be used. For example, sensor hub 304 includes logic in which zone 1 and zone 2 use different values for parameters of prediction algorithm 353 and/or different prediction algorithms 353 for zone 1 and zone 2.

Figure 4B:
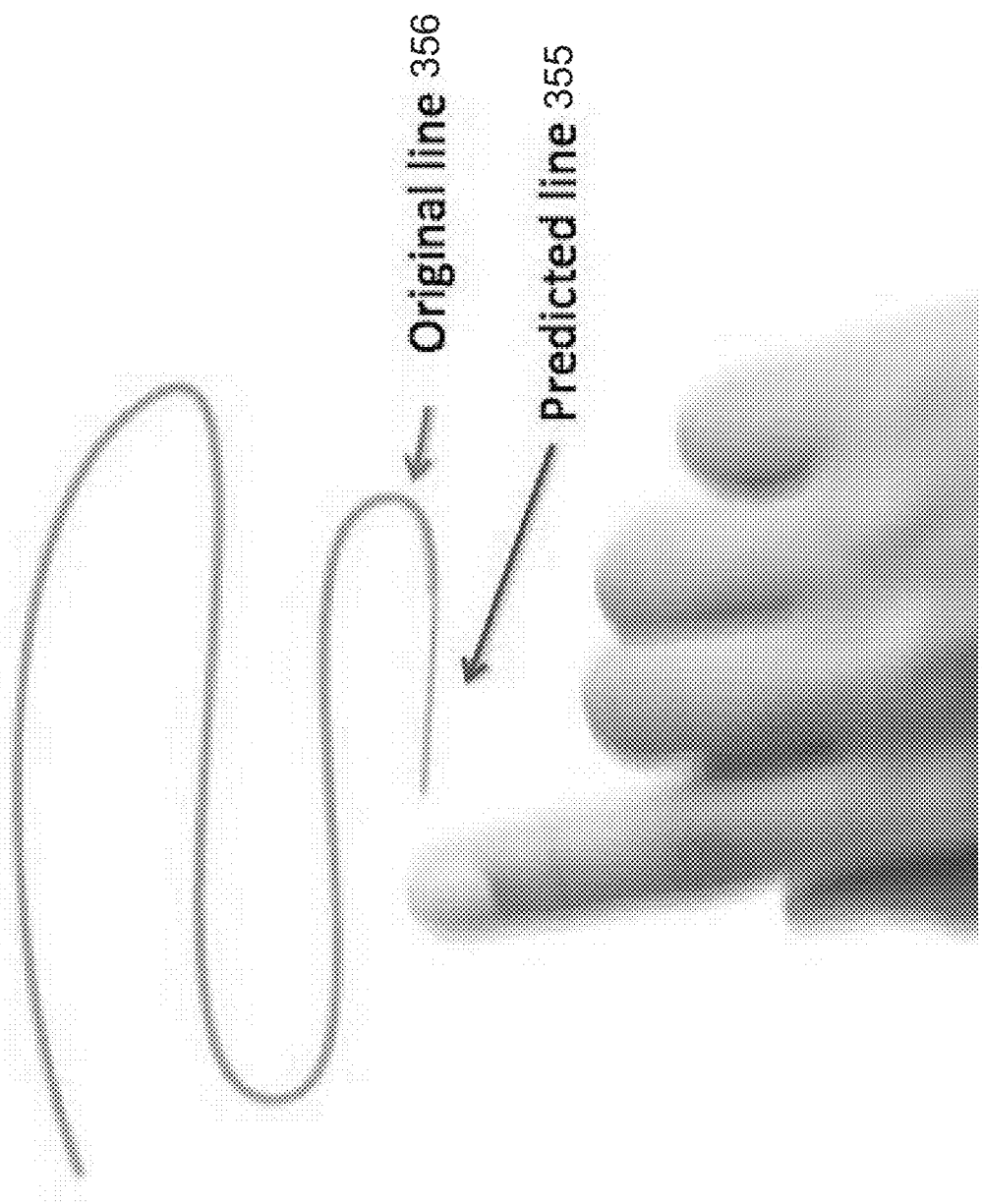
FIG. 4B is a diagram illustrating an exemplary output from the prediction input system.

As a result of the zone-based selection criterion, the input data is processed according to the logic of sensor hub 304 and predictive input data is generated. The predictive input data is exposed to application 313 via driver 305 and/or touch/touchless library 311. For example, referring to FIG. 4B, the prediction input data may be displayed as a predicted line 355 that extends from an original line 356 (e.g., stemming from real data). By way of further explanation, sensor hub 304 may have determined that original line 356 occurred in zone 2 (see FIG. 4A) in which prediction input data is generated. The prediction input data is exposed via application 313 (e.g., a drawing application) to produce predicted line 355, which is displayed via display 125.

Figure 4C:
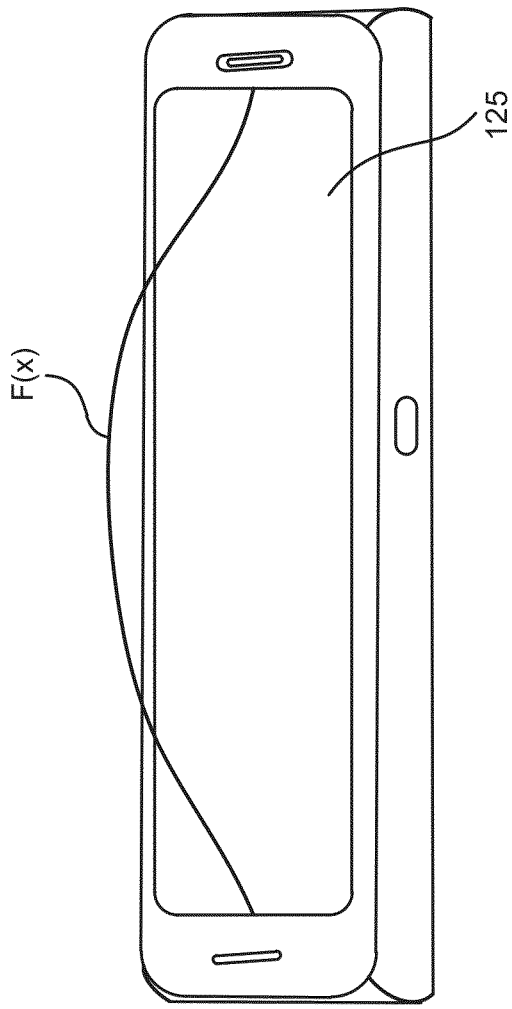
FIG. 4C is a diagram illustrating another exemplary embodiment of a prediction input system.
Figure 4C:
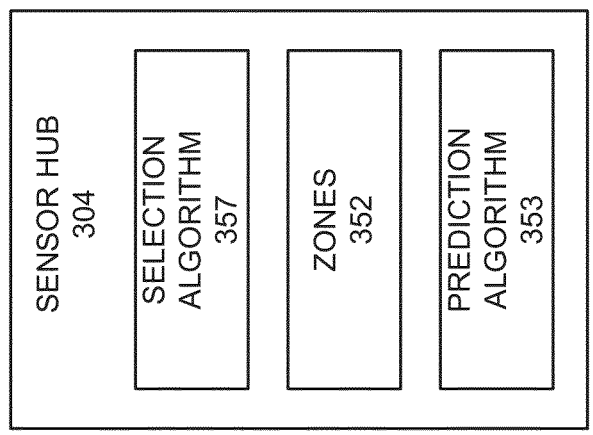

Referring to FIG. 4C, according to an exemplary embodiment, sensor hub 304 may use a selection algorithm 357 to select the predictive method. As previously described, selection algorithm 357 may be implemented as a linear algorithm, an exponential algorithm, a lookup table-based algorithm, etc. According to an exemplary embodiment, selection algorithm 357 may gradually change the predictive parameters/methods (i.e., a look-ahead prediction value, the value of a parameter of prediction algorithm 353, and/or prediction algorithm 353 (i.e., the prediction model)) depending on where the user input occurs via display 125. For example, the gradual change in the predictive parameters may be implemented based on an interpolation of values given by multiple prediction algorithms 353.

Zones 352 may be similar to zones 351, however, zones 352 include these interpolated values. Selection algorithm 357 selects the appropriate predictive parameters (e.g., values for prediction algorithm 353 and a look-ahead value) based on zones 352. However, according to an exemplary implementation, the display area of each zone of zones 352, may be smaller relative to each zone of zones 351, so as to allow a more "gradual" change of predictive parameters. As an example, a zone of zones 352 may constitute a display area having the size and shape of an imaginary finger of a user or an instrument used by the user (e.g., an end of a stylus, etc.). By way of illustration, referring to FIG. 4C, assume a function (i.e., $F(x)$) represents values for the look-ahead prediction parameter relative to an area of display 125. Although the function is illustrated as two-dimensional, the function $F(x)$ may be three-dimensional. By virtue of the values of function $F(x)$, as a user moves from the center display area of display 125 with, for example, his or her finger closer towards an edge of display 125, the look-ahead prediction value gradually becomes smaller. Alternatively, the function $F(x)$ may represent a value for a parameter of prediction algorithm 353. For example, the value may pertain to a parameter that controls the sensitivity to noise. These values may be obtained from interpolation. According to such an example, selection algorithm 353 selects a value used by a particular prediction algorithm 353, depending on the area of display 125, and the corresponding prediction algorithm 353. In this case of gradually changing multiple parameters of prediction algorithm 353, selection algorithm 357 may rely on multiple functions $F(x)$ in which each function $F(x)$ relates to a particular parameter of prediction algorithm 353.

According to another exemplary implementation, the function $F(x)$ may also be a scaling value for a specific parameter range. For example, the scaled value may, for example, increase exponentially (e.g., when using an exponential algorithm) when the event coordinates close to the center of display 125. In this regard, a parameter value may be a function of range and scale (e.g., Parameter Value (Range, Scale)). Also, for prediction algorithms using multiple parameters, there may be a function F(x) for each parameter.

As previously described, although an embodiment of a prediction input system has been described in relation to sensor hub 304, according to other embodiments, these functions may be implemented by another component of input system 350 or a combination of components, which may or may not include sensor hub 304. By way of example, the prediction input system may be implemented by touch/touchless IC 303 and sensor hub 304, sensor hub 304 and touch/touchless library 311, or touch/touchless library 311, etc.

Figure 5A:
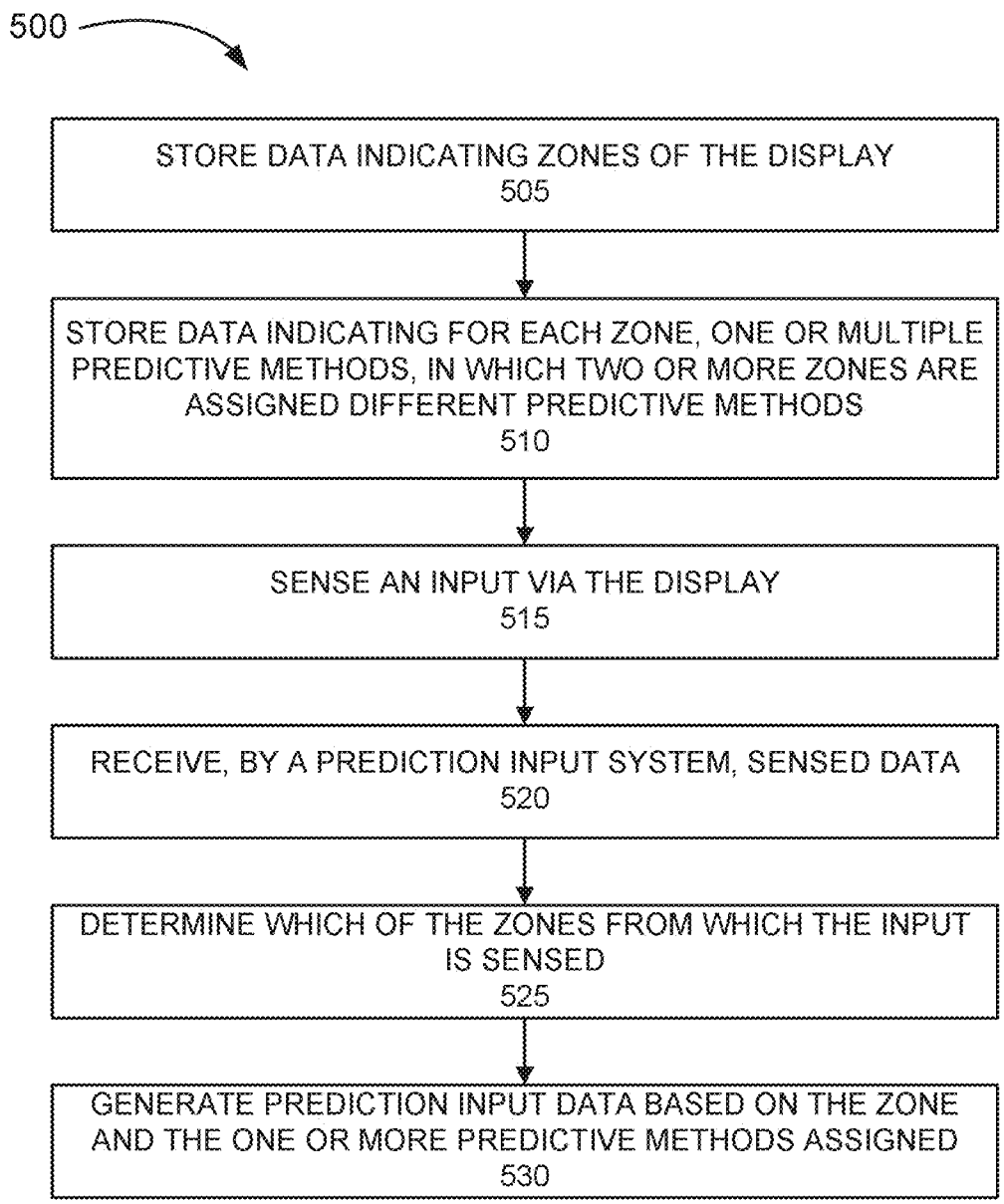
FIGS. 5A and 5B are flow diagrams illustrating an exemplary process pertaining to an exemplary embodiment of the prediction input system.

FIG. 5A is a flow diagram illustrating an exemplary process 500 for generating predictive input data. A step or an act of process 500 is performed by the predictive input system. For example, processor 205 may execute software 215 to perform the step described. For process 500, it may be assumed that a characterization of display 125 has been obtained and that predictive input accuracy signature has been generated based on the characterization. It may also be assumed that display 125 includes a capacitive-based display. However, process 500 may be applicable to another type of display 125 that exhibits variations of noise levels relative to different areas of display 125 and/or variations of accuracy pertaining to prediction.

Process 500 begins, in block 505, with data indicating zones of a display being stored. For example, as previously described, the display area of display 125 is divided into zones based on accuracy pertaining to prediction of a user input. The size and the shape of a zone may be based on a noise level associated with a display area of display 125.

In block 510, data is stored indicating for each zone, one or multiple predictive methods that are assigned, in which two or more zones are assigned different predictive methods. For example, as previously described, the predictive methods include a look-ahead prediction value, a value of a parameter pertaining to a prediction algorithm, and a prediction algorithm. By way of further example, two or more zones may be assigned different look-ahead prediction values, different prediction algorithms, and/or different values of a parameter pertaining to a prediction algorithm. Data may be stored that indicates the assignment of one or multiple predictive methods to a zone.

In block 515, a display senses an input. For example, a user touches (e.g., with the user's finger, an instrument, etc.) display 125. Alternatively, when display 125 is a touchless display, the user places his/her finger or instrument proximate to display 125. In response, display 125 senses the input via one or multiple sensing technologies (e.g., capacitive, resistive, etc.).

In block 520, a prediction input system receives sensed data. For example, sensor hub 304 or touch/touchless library 311 receives the sensed data.

In block 525, the zone from which the input is sensed is determined. For example, sensor hub 304 or touch/touchless library 311 determines which of the zones the input is sensed via display 125.

In block 530, prediction input data is generated based on the zone and the one or more predictive methods assigned to the zone. For example, sensor hub 304 or touch/touchless library 311 generates prediction input data based on the look-ahead prediction value assigned to the zone, prediction algorithm 353 assigned to the zone, and/or the value of a parameter of the prediction algorithm 353 assigned to the zone. As an example, the prediction input data may correspond to predicted line 355 of FIG. 4B.

Although FIG. 5A illustrates an exemplary process 500, according to other embodiments, process 500 may include additional operations, fewer operations, and/or different operations than those illustrated in FIG. 5A and described. For example, process 500 may include exposing the prediction input data via application 313. Additionally, as previously described, the predictive methods assigned to a zone may be on a per-user and/or per-application basis. In this regard, process 500 may include steps that identify the user and/or identify the application via which the input is received.

Figure 5B:
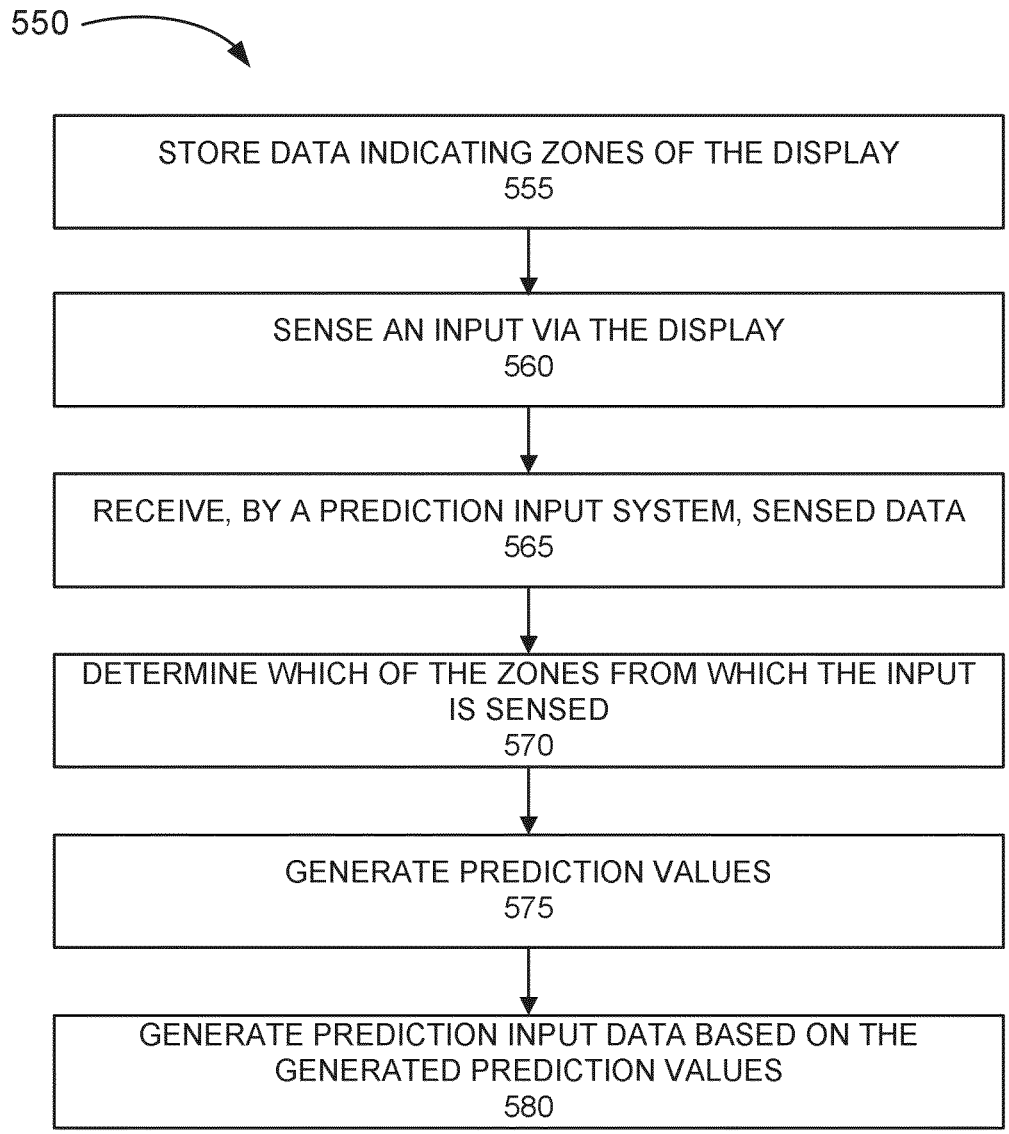

FIG. 5B is a flow diagram illustrating an exemplary process 550 for generating predictive input data. A step or an act of process 550 is performed by the predictive input system. For example, processor 205 may execute software 215 to perform the step described. For process 550, it may be assumed that a characterization of display 125 has been obtained and that predictive input accuracy signature has been generated based on the characterization. It may also be assumed that display 125 includes a capacitive-based display. However, process 550 may be applicable to another type of display 125 that exhibits variations of noise levels relative to different areas of display 125 and/or variations of accuracy pertaining to prediction.

Process 550 begins, in block 555, with data indicating zones of a display being stored. For example, as previously described, the display area of display 125 is divided into zones based on accuracy pertaining to prediction of a user input. The size and the shape of a zone may be based on a noise level associated with a display area of display 125.

In block 560, a display senses an input. For example, a user touches (e.g., with the user's finger, an instrument, etc.) display 125. Alternatively, when display 125 is a touchless display, the user places his/her finger or instrument proximate to display 125. In response, display 125 senses the input via one or multiple sensing technologies (e.g., capacitive, resistive, etc.).

In block 565, a prediction input system receives sensed data. For example, sensor hub 304 or touch/touchless library 311 receives the sensed data.

In block 570, the zone from which the input is sensed is determined. For example, sensor hub 304 or touch/touchless library 311 determines which of the zones the input is sensed via display 125.

In block 575, prediction values are generated. For example, selection algorithm 357 generates prediction values based on the sensed input data and the zone. For example, selection algorithm 357 selects prediction algorithm 353 to be used for the zone. Additionally, selection algorithm 357 identifies the prediction values for the selected prediction algorithm 353 that are to be generated. Selection algorithm 357 may generate the prediction values. For example, selection algorithm 357 may generate an interpolated parameter value and/or may select a function F(x) (e.g., a prediction value function) to generate a parameter value, as previously described. For example, a parameter value may be generated based on a function F(x), such as Parameter value (range, scale) in which a particular range for a value and a scale (e.g., a scalar) are arguments of the function F(x) for generating the parameter value. Additionally, or alternatively, the function F(x) may pertain to a look-ahead prediction value. Additionally, as described in relation to process 500, the prediction values, prediction algorithms, and/or the look-ahead prediction values may be different between different zones.

In block 580, prediction input data is generated. For example, sensor hub 304 or touch/touchless library 311 generates prediction input data based on the generated predicted values. For example, prediction algorithm 353 receives the generated prediction values and generates prediction input data. As an example, the prediction input data may correspond to predicted line 355 of FIG. 4B.

Although FIG. 5B illustrates an exemplary process 550, according to other embodiments, process 550 may include additional operations, fewer operations, and/or different operations than those illustrated in FIG. 5B and described. For example, process 550 may include exposing the prediction input data via application 313. Additionally, as previously described, the predictive methods assigned to a zone may be on a per-user and/or per-application basis. In this regard, process 550 may include steps that identify the user and/or identify the application via which the input is received.

Turning to yet another exemplary embodiment, as previously described, a prediction step parameter, which is responsive to a user input via display 125, is included in the input event processing. According to an exemplary embodiment, the prediction step parameter indicates the size of a prediction, which may be measured by the number of events or time duration. The prediction step parameter may be configured as a static value or a dynamic value. According to an exemplary embodiment, the value of the prediction step parameter may be determined based on characteristics of the user input. As previously described, a user input characteristic may include acceleration between events and/or speed between events. For example, when a user performs a gesture (e.g., drawing a line), the gesture may include facets of acceleration and/or variations in speed. An acceleration factor and/or a speed factor may be calculated based on an analysis of the input data corresponding to the gesture, and depending on the value of the acceleration factor and/or the value of the speed factor, the prediction step parameter may be changed (e.g., increased or decreased) or remain static. Based on the adaptive nature of the prediction step parameter, as described herein, the occurrence of overshoots may be reduced.

According to an exemplary embodiment, an algorithm is applied to reduce/remove tangles, as described further below. Additionally, according to an exemplary embodiment, a smoothing filter/algorithm is used following the reduction/removal of tangles, as described herein.

Figure 6A:
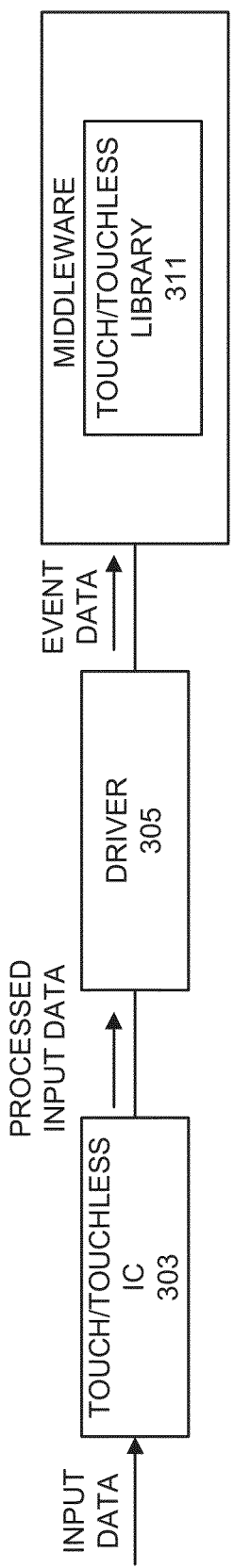
FIGS. 6A and 6B are diagrams illustrating yet another exemplary embodiment of the prediction input system.
Figure 6B:
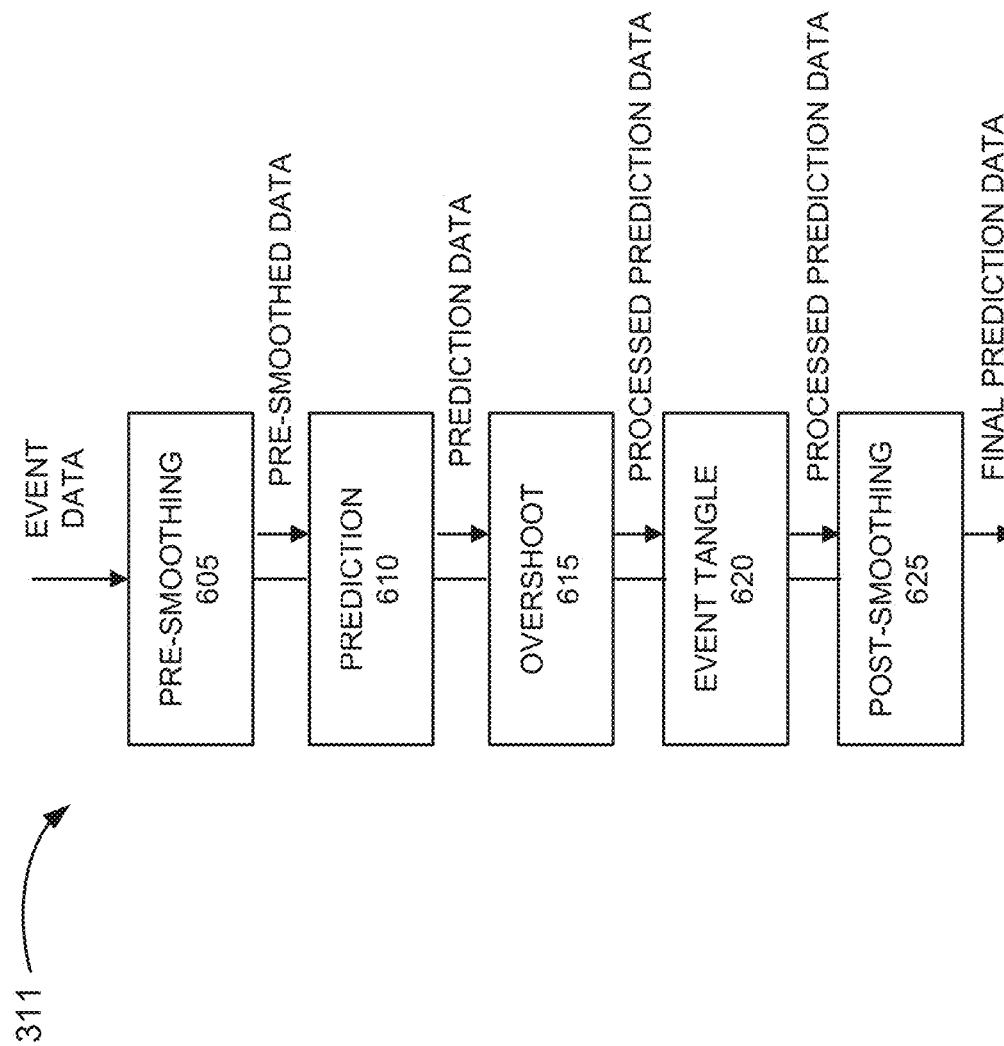

FIGS. 6A and 6B are diagrams illustrating an exemplary embodiment of the predictive input system. Referring to FIG. 6A, assume that input data, which stems from a user's interaction with display 125, is received by touch/touchless IC 303. Touch/touchless IC 303 may, for example, calculate coordinates, amplify the user input signal, convert the user input signal into the digital domain, etc. Touch/touchless IC 303 outputs processed input data to driver 305. Driver 305 assembles different parts of touch/touchless event into a complete event. For example, the difference parts may include X, Y, and Z coordinates, pointer size, orientation, and synch signal. Driver 305 outputs event data to touch/touchless library 311.

Referring to FIG. 6B, touch/touchless library 311 includes logic that performs various functions, as described. According to an exemplary embodiment, touch/touchless library 311 includes the event management of the operating system (OS) of user device 100. The event management of the OS passes the event data to a prediction library. The prediction library includes logic to perform the tasks, as described herein. For example, the logic includes a pre-smoothing 605, a prediction 610, an overshoot 615, an event tangle 620, and a post-smoothing 625. The event data may include noise. Pre-smoothing 605 applies a smoothing algorithm to the event data to address any noise that may be present. For example, pre-smoothing 605 may apply the Savitzky-Golay algorithm or another algorithm in a step-by-step manner. Since the algorithm is applied to the event data during runtime, when event data is continuously being received, pre-smoothing 605 may apply the Savitzky-Golay algorithm or another algorithm on a portion of the event data. According to an exemplary implementation, the algorithm is applied to one-half (or other configurable portion) of the event data. For example, a half data set window may be continuously moved as new event data is received. It should be noted that for some touch or touchless display, the event data may be stable. Thus, the pre-smoothing process of pre-smoothing 605 is an optional step.

Next, the pre-smoothed data is received by prediction 610 to generate prediction data. For example, prediction 610 may apply a prediction algorithm, such as the Unscented Kalman Filter algorithm, the DESP algorithm, the Polyfit algorithm, etc. However, during the start, for example, of a touch movement (e.g., a user's swiping gesture), there can be a swift increase in real data. This is due to the fact that prediction data is not generated until a sufficient amount of real data, which is representative of the user's input, has been received and processed. This can lead to a "catch-up" situation in terms of processing the incoming input data. To avoid this jump or spike of real data, which in turn is used to generate prediction data, prediction 610 gradually increases its prediction step based on an interpolation between predicted positions over a first number of events. For example, the first number of events may correspond to 10 events or some other number of events. Various methods of interpolation may be implemented, such as linear interpolation, exponential interpolation, etc.

As further illustrated in FIG. 6B, prediction data is received by overshoot 615. As previously described, an artifact of prediction is overshoot. That is, a prediction algorithm may not adapt fast enough to large and fast changes in speed, acceleration, and/or direction pertaining to the user's input. As a result, from a user's perspective, various input responses may occur. For example, if the user is scrolling (e.g., in a list), the overshoot may manifest as a bounce when the user stops moving his/her finger. According to another example, if the user is using a drawing application, overshoot may manifest such that a line continues to be drawn a bit after the user stops moving his/her finger, and then the line turns and comes back to the user's finger. Overshoot 615 compensates for these types of artifacts. For example, overshoot 615 identifies the acceleration between events and a value of an acceleration factor, which is based on the acceleration, is calculated. Depending on the value of the acceleration factor, overshoot 615 determines whether the prediction step should be increased, decreased or maintained. For example, if the value of the acceleration factor is large (e.g., equal to or more than a threshold value), the prediction step may be decreased. Alternatively, if the value of the acceleration factor is small (e.g., equal to or more than a threshold value), the prediction step may be increased. Additionally, if the value of the acceleration factor is of a particular value or within a particular range of values, the prediction step may be maintained Additionally, or alternative, overshoot 615 identifies the speed between events pertaining to the user's input and a value for a speed factor, which is based on the speed, is calculated. Depending on the value of the speed factor, overshoot 615 determines whether the prediction step should be increased, decreased, or maintained. In a manner similar to that described above, if the value of the speed factor is large, the prediction step may be decreased. If the value of the speed factor is small, the prediction step may be decreased, and if the value of the speed factor is of a particular value or within a range of values, the prediction step may be maintained.

As illustrated, processed prediction data is output by overshoot 615 and sent to event tangle 620. Event tangle 620 removes the tangle of events. According to an exemplary embodiment, tangle 620 performs the following operation. Event tangle 620 compares the sign of the direction between real events E(t−1) and E(t) pertaining to the user input with the sign of the direction between the predicted events P(t−1) and P(t). If the signs differ, the previous predicted value is kept (i.e., P(t)=P(t−1)), otherwise, the signs are maintained. Thereafter, processed prediction data is output by event tangle 620 to post-smoothing 625. This process is described further below.

According to an exemplary implementation, event tangle 620 compares a direction of a predicted velocity vector with a direction of a velocity vector associated with the user's actual finger/instrument that is on or proximate to display 125. If the velocity vectors do not point in the same general direction (e.g., the dot-product of the velocity vectors is negative), then the prediction is "backtracking," which may create artifacts (e.g., unwanted noise, loops in the curve, etc.). If event tangle 620 detects this condition (i.e., that the velocity vectors do not point in the same general direction), event tangle 620 resets the prediction to previous predicted coordinates (i.e., the prediction stays in place). According to another exemplary implementation, event tangle 620 may operate differently in response to this condition. For example, if event tangle 620 determines that the current user gesture is a fast-turning curve (e.g., the estimated angular velocity of the predicted vector is above a threshold value), event tangle 620 may allow the predicted velocity vector to point in an opposite direction to the direction of the velocity vector associated with the user's actual finger/instrument.

Prediction can increase existing jitter and irregularities of the events. This means that small errors before the prediction can be quite large afterwards. In this regard, post-smoothing 625 smoothes the processed prediction data. For example, various smoothing algorithms may be used, such as Savitzky-Golay, moving average, exponential moving average, etc. Thereafter, final prediction data is output. For example, the prediction library outputs the final prediction data to the event management of the OS. The final prediction data is representative of the predictive input data. The final prediction data is sent to application 313 and provided to the user (e.g., via display 125).

As previously described, although an embodiment of a prediction input system has been described in relation to touch/touchless library 311, according to other embodiments, these functions may be implemented by another component of input system 350 or a combination of components, which may or may not include touch/touchless library 311. By way of example, the prediction input system may be implemented by touch/touchless IC 303 and sensor hub 304, driver 305 and touch/touchless library 311, etc.

In the example described above in relation to FIG. 6B, the functionalities described may be performed using a main CPU (e.g., processor 205) in user space. However, one or more of the functional components described may be executed using a specific digital signal processor, a dedicated microcontroller unit, or other suitable processor. For example, touch/touchless IC 303 may be used to carry out one or more of the functions described. Nevertheless, by using the main CPU, the generation of predictive input data may negatively impact normal processing. Conversely, by using, for example, a dedicated processor, architectural complexities are added to user device 100.

Figure 7:
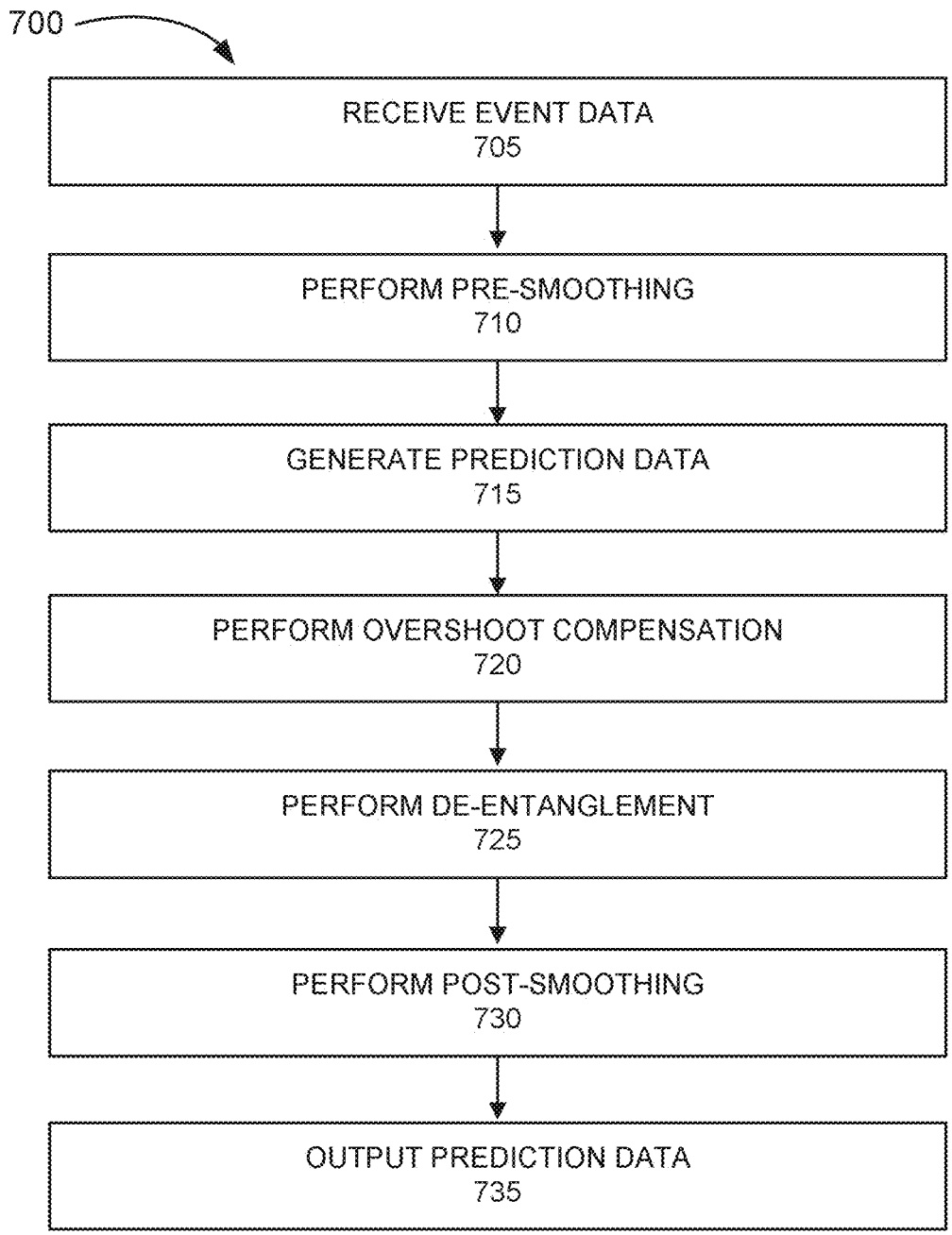
FIG. 7 is a flow diagram illustrating an exemplary process pertaining to the exemplary embodiment of the prediction input system.

FIG. 7 is a flow diagram illustrating an exemplary process 700 for generating predictive input data. A step or an act of process 700 is performed by the predictive input system. For example, processor 205 may execute software 215 to perform the step described. For process 700, it may be assumed a user input is received (e.g., as previously described in block 515 of process 500) and that the prediction input system receives the sensed data (e.g., as previously described in block 520 of process 500).

Process 700 begins, in block 705, with receiving event data. For example, touch/touchless library 311 receives event data from driver 305.

In block 710, pre-smoothing is performed. For example, pre-smoothing 605 applies a smoothing algorithm. As previously described, when the event data is continuously received, a sliding window may be used as a marker to smooth a portion of the event data. The sliding window may be configured based on a period of time (e.g., X milliseconds) or event size (e.g., 2 events, 3 events, etc.). The sliding window is moved as new event data is received.

In block 715, prediction data is generated. For example, prediction 610 receives the pre-smoothed data and generates prediction data. Prediction 610 gradually increases its prediction step based on an interpolation between predicted positions over a first (configurable) number of events.

In block 720, overshoot compensation is performed. For example, overshoot 615 receives the prediction data. Overshoot 615 identifies acceleration between events and/or speed between events. Overshoot 615 calculates specific factors based on the acceleration and/or the speed, and determines whether the prediction step should be increased, decreased, or remain the same.

In block 725, de-entanglement is performed. For example, event tangle 620 receives the processed prediction data and removes a tangle of events. As previously described, Event tangle 620 compares the sign of the direction between real events E(t−1) and E(t) pertaining to the user input with the sign of the direction between the predicted events P(t−1) and P(t). If the signs differ, the previous predicted value is kept (i.e., P(t)=P(t−1)), otherwise, the signs are maintained. Thereafter, processed prediction data is output by event tangle 620 to post-smoothing 625.

In block 730, post-smoothing is performed. For example, post-smoothing 625 receives the processed prediction data. Post-smoothing 625 applies a smoothing algorithm to the processed prediction data.

In block 735, prediction data is output. For example, touch/touchless library 311 outputs the final prediction data to application 313. The final prediction data may be displayed via display 125.

Although FIG. 7 illustrates an exemplary process 700, according to other embodiments, process 700 may include additional operations, fewer operations, and/or different operations than those illustrated in FIG. 7 and described. For example, according to other embodiments, block 710 may be omitted. Additionally, or alternatively, steps from process 500 may be combined with steps from process 700. For example, pre-smoothing of step 710 of process 700 may be applied to event data prior to step 530 of process 500.

Additionally, or alternatively, subsequent to the generation of prediction input data, as described in relation to step 530 of process 500, overshooting compensation, event de-entanglement, and/or post-smoothing, as described in steps 720, 725, and 730, respectively, may be carried out. Additionally, in view of the zone-based selection criterion of process 500, the pre-smoothing, the overshooting compensation, event de-entanglement, and/or post-smoothing, may also be zone-based, in which different smoothing algorithms may be used, different values of the smoothing algorithm, different "specific factors" pertaining to increasing, decreasing, or maintaining the predictive step, etc., may be used depending on the zone.

The foregoing description of embodiments provides illustration, but is not intended to be exhaustive or to limit implementations to the precise form disclosed. Modifications and variations of the embodiments and/or implementations are possible in light of the above teachings, or may be acquired from practice of the teachings.

An embodiment can also be implemented through computer readable code/instructions stored by a storage medium. A storage medium may comprise one or more of the storage media described above in relation to memory/storage 215. The storage medium may also comprise data and/or information, such as a data file, a data structure, and software, such as a program module, an application, etc. Computer readable code may comprise both machine code, such as produced by a compiler, and files comprising higher level code that may be executed by a computational device using, for example, an interpreter.

The flowcharts and blocks illustrated and described with respect to FIGS. 5A, 5B, and 7 illustrate exemplary processes according to an exemplary embodiment. However, according to other embodiments, the function(s) or act(s) described with respect to a block or blocks may be performed in an order that is different than the order illustrated and described. For example, two or more blocks may be performed concurrently, substantially concurrently, or in reverse order, depending on, among other things, dependency of a block to another block.

The terms "comprise," "comprises" or "comprising," as well as synonyms thereof (e.g., include, etc.), when used in the specification is meant to specify the presence of stated features, integers, steps, or components but does not preclude the presence or addition of one or more other features, integers, steps, components, or groups thereof. In other words, these terms are to be interpreted as inclusion without limitation.

The term "logic" or "component," when used in the specification may include hardware (e.g., processor 205) or a combination of hardware and software (software 215).

The terms "a," "an," and "the" are intended to be interpreted to include both the singular and plural forms, unless the context clearly indicates otherwise. Further, the phrase "based on" is intended to be interpreted to mean, for example, "based, at least in part, on," unless explicitly stated otherwise. The term "and/or" is intended to be interpreted to include any and all combinations of one or more of the associated list items.

In the specification and illustrated by the drawings, reference is made to "an exemplary embodiment," "an embodiment," "embodiments," etc., which may include a particular feature, structure or characteristic in connection with an embodiment(s). However, the use of these terms or phrases does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction disclosed in the specification should be construed as critical or essential to the embodiments described herein unless explicitly described as such.

What is claimed is:

1. A device comprising:
a display, wherein the display is configured to operate in at least one of a touch mode or a touchless mode;
a predictive input system communicatively coupled to the display, wherein the predictive input system comprises:
a memory, wherein the memory stores instructions; and
a processor, wherein the processor executes the instructions to:
store zone data indicating zones of the display, wherein each zone constitutes a portion of a display area of the display;
store predictive parameter data, wherein each zone of the zone data is assigned a subset of the predictive parameter data, wherein each subset of the predictive parameter data indicates at least one of a look-ahead prediction value that indicates a time period corresponding to how far in the future a predictive user input pertains, an indication of a particular prediction algorithm, or at least one value used by the particular prediction algorithm, and wherein at least two zones of the display have different values for the subsets of predictive parameter data;
receive, via the display, input data representing an actual user's input;
determine the zone in which the input data is received;
generate prediction data based on the input data, the zone data associated with the determined zone, and the subset of predictive parameter data associated with the determined zone, the prediction data being a prediction of future user input that extends the actual user's input on the display along a predicted line of input that extends beyond the actual user's input; and
output the prediction data.

2. The device of claim 1, wherein the zone data is generated based on a predictive input accuracy signature of an entire display area of the display, wherein the predictive input accuracy signature indicates an accuracy for calculating predictive data based on different noise levels associated with respective portions of the display area, wherein the display uses a capacitive-based sensing technology, and wherein the display displays the prediction data.

3. The device of claim 1, wherein the display includes a single-point input device or a multi-point input device, and wherein the user device comprises a mobile communication device having telephone and data communication capabilities.

4. The device of claim 1, wherein the at least one value includes an interpolated value, and wherein a number of zones is two or three, and a shape of each zone is different.

5. The device of claim 1, wherein the at least one value pertains to a sensitivity to noise, and wherein a shape and a size of each zone is unlike a size and shape of the user's input stemming from the user's finger or an instrument used by the user.

6. A method comprising:
storing, by a user device that includes a display, zone data indicating zones of the display, wherein each zone constitutes a portion of a display area of the display, and the display is at least one of a touch display or a touchless display;

storing, by the user device, predictive parameter data, wherein each zone of the zone data is assigned a subset of the predictive parameter data, wherein each subset of the predictive parameter data indicates at least one of a look-ahead prediction value that indicates a time period corresponding to how far in the future a predictive user input pertains, an indication of a particular prediction algorithm, or at least one value used by the particular prediction algorithm, and wherein at least two zones of the display have different values for the subsets of the predictive parameter data;

receiving, by the user device, input data representing an actual user's input;

determining, by the user device, the zone in which the input data is received;

generating, by the user device, prediction data based on the input data, the zone data associated with the determined zone, and the subset of predictive parameter data associated with the determined zone, the prediction data being a prediction of future user input that extends the actual user's input on the display along a predicted line of input that extends beyond the actual user's input; and outputting, by the user device, the prediction data.

7. The method of claim 6, wherein a shape and a size of each zone is unlike a shape and size of the user's input stemming from the user's finger or an instrument used by the user.

8. A device comprising:
a display, wherein the display is configured to operate in at least one of a touch mode or a touchless mode;
a predictive input system communicatively coupled to the display, wherein the predictive input system comprises:
a memory, wherein the memory stores instructions; and
a processor, wherein the processor executes the instructions to:
receive, via the display, input data representing an actual user's input;
convert the input data into event data;
generate prediction data representing a prediction of future user input that extends the actual user's input on the display along a predicted line of input that extends beyond the actual user's input, the prediction data based on the event data, a prediction algorithm, and a predictive step value, wherein the predictive step value indicates a time period corresponding to how far in the future the prediction of user input is made, and wherein the predictive step value is gradually increased based on an interpolation between predicted positions over a pre-determined number of events;
perform overshoot compensation to the prediction data;
perform de-entanglement between events based on a sign of a direction between real events associated with the user's input compared to a sign of direction between predicted events;
perform post-smoothing; and
output the prediction data.

9. The device of claim 8, wherein the processor further executes the instructions to: perform pre-smoothing of the event data using a smoothing algorithm, wherein an event data window having an event data window size corresponding to half of the event data is used to designate a portion of the event data to be pre-smoothed, and wherein the event data window is continuously moved as new event data is received.

10. The device of claim 8, wherein, when performing overshoot compensation, the processor further executes the instructions to: determine an acceleration between events; calculate a first value based on the acceleration; and
determine whether the prediction step value is to be increased, be decreased, or remain as is based on the first value.

11. The device of claim 10, wherein, when performing overshoot compensation, the processor further executes the instructions to: determine a speed between the events; calculate a second value based on the speed; and determine whether the prediction step value is to be increased, be decreased, or remain as is based on the first value and the second value.

12. The device of claim 8, wherein the predicted events include a previous predicted event P(t−1) and a current predicted event P(t), and wherein, when performing de-entanglement, the processor further executes the instructions to:
maintain a value of the previous predicted event P(t−1) for the current predicted event P(t) if the sign of direction between the real events differ from the sign of direction between the predicted events.

13. A method comprising:
receiving, by a user device that includes a display, input data representing an actual user's input, wherein the display is at least one of a touch display or a touchless display;
converting, by the user device, the input data into event data;
generating, by the user device, prediction data representing a prediction of future user input that extends the actual user's input on the display along a predicted line of input that extends beyond the actual user's input, the prediction data based on the event data, a prediction algorithm, and a predictive step value, wherein the predictive step value indicates a time period corresponding to how far in the future the prediction of user input is made, and wherein the predictive step value is gradually increased based on an interpolation between predicted positions over a pre-determined number of events;
performing, by the user device, overshoot compensation to the prediction data;
performing, by the user device, de-entanglement between events based on a sign of a direction between real events associated with the user's input compared to a sign of direction between predicted events;
performing, by the user device, post-smoothing; and
outputting, by the user device, the prediction data.

14. The method of claim 13, further comprising: performing pre-smoothing of the event data using a smoothing algorithm, wherein an event data window having an event data window size corresponding to half of the event data is used to designate a portion of the event data to be pre-smoothed, and wherein the event data window is continuously moved as new event data is received.

15. The method of claim 13, wherein the performing overshoot compensation comprises: determining an acceleration between events; calculating a value of an acceleration factor based on the acceleration; and determining whether the prediction step value is to be increased, be decreased, or remain as is based on the value.

16. The method of claim 13, wherein the input data corresponds to handwriting or drawing by the user.

17. The method of claim 13, wherein the input data corresponds to user scrolling input.

18. A method comprising:
- storing, by a user device that includes a display, zone data indicating zones of the display, wherein each zone constitutes a portion of a display area of the display, and the display is at least one of a touch display or a touchless display;
- receiving, by the user device, input data representing an actual user's input;
- determining, by the user device, the zone in which the input data is received;
- selecting, by the user device, a prediction value function based on the zone;
- generating, by the user device, a prediction value based on the prediction value function;
- generating, by the user device, prediction data based on a prediction algorithm using the prediction value, the prediction data being a prediction of future user input that extends the actual user input on the display along a predicted line of input that extends beyond the actual user's input; and
- outputting, by the user device, the prediction data.

19. The method of claim 18, wherein the prediction value function outputs a predictive scaled value based on a range argument and a scalar argument.

20. The method of claim 18, wherein at least two zones of the display have different prediction values.

* * * * *